(12) United States Patent
Hu et al.

(10) Patent No.: US 11,275,036 B2
(45) Date of Patent: Mar. 15, 2022

(54) NON-DESTRUCTIVE TESTING METHODS AND APPARATUS

(71) Applicant: Nanyang Technological University, Singapore (SG)

(72) Inventors: Xiao Hu, Singapore (SG); Chenzhong Mu, Singapore (SG); Liying Zhang, Singapore (SG)

(73) Assignee: Nanyang Technological University, Singapore (SG)

( * ) Notice: Subject to any disclaimer, the term of this patent is extended or adjusted under 35 U.S.C. 154(b) by 404 days.

(21) Appl. No.: 16/465,957

(22) PCT Filed: Dec. 11, 2017

(86) PCT No.: PCT/SG2017/050610
§ 371 (c)(1),
(2) Date: May 31, 2019

(87) PCT Pub. No.: WO2018/106194
PCT Pub. Date: Jun. 14, 2018

(65) Prior Publication Data
US 2019/0317026 A1 Oct. 17, 2019

(30) Foreign Application Priority Data
Dec. 9, 2016 (SG) ............................ 10201610348V

(51) Int. Cl.
*G01N 22/02* (2006.01)
(52) U.S. Cl.
CPC ......... *G01N 22/02* (2013.01); *G01N 2223/03* (2013.01); *G01N 2223/052* (2013.01); *G01N 2223/615* (2013.01)
(58) Field of Classification Search
CPC .. G01N 22/02; G01N 27/221; G01N 2223/03; G01N 2223/052; G01N 2223/615
See application file for complete search history.

(56) References Cited

U.S. PATENT DOCUMENTS

2002/0048306 A1* 4/2002 Sauvant ................. G01N 25/12
374/21
2005/0150278 A1 7/2005 Troxler et al.
(Continued)

FOREIGN PATENT DOCUMENTS

| CN | 102401804 A | 4/2012 |
| WO | 2016003291 A1 | 1/2016 |
| WO | 2018106194 A1 | 6/2018 |

OTHER PUBLICATIONS

Mechanical and Microwave Absorbing Properties for Graphene and/or Carbon Nanotube/Continuous Carbon Giber Reinforced Epoxy Resin Nanocomposites, Zhang D., PhD Thesis. May 28, 2015 [Retrieved on Feb. 23, 2018 from http://cdmd.cnki.com.cn/Article/CDMD-10010-1015725122.htm].
(Continued)

*Primary Examiner* — Mark R Gaworecki

(57) ABSTRACT

A non-destructive testing method of analyzing a sample comprising a composite material is disclosed. The method comprises: emitting an electromagnetic signal onto the sample, the electromagnetic signal having a range of frequencies; detecting a response signal transmitted and/or reflected by the sample in response to the electromagnetic signal; processing the response signal to determine variation with frequency of a dielectric permittivity of the sample over the range of frequencies; and determining an indication of a structural characteristic of the sample from a measure of the variation with frequency of the dielectric permittivity of the sample.

16 Claims, 13 Drawing Sheets

(56) References Cited

U.S. PATENT DOCUMENTS

| | | | | |
|---|---|---|---|---|
| 2008/0262748 A1* | 10/2008 | Ossart | ............... | C12M 41/36 |
| | | | | 702/21 |
| 2011/0178748 A1 | 7/2011 | Shlepnev | | |
| 2015/0025807 A1 | 1/2015 | Anderson et al. | | |
| 2015/0346131 A1* | 12/2015 | Mohseni | ............. | G01N 27/026 |
| | | | | 324/663 |
| 2019/0029555 A1* | 1/2019 | Suster | ............... | G01N 27/221 |

OTHER PUBLICATIONS

Glenis G. X. et al., Dielectric spectroscopy on alumina-epoxy composites towards the quantification of filler-particulate microstructure effects. 2015 IEEE Conference on Electrical Insulation and Dielectric Phenomena (CEIDP), Dec. 17, 2015, pp. 684-687 [Retrieved on Feb. 26, 2018] <DOI: 10.1109/CEIDP.2015.7352026>.

Foreign Communication from a Related Counterpart Application, International Search Report and Written Opinion dated Mar. 8, 2018, International Application No. PCT/SG2017/050610 filed on Dec. 11, 2017.

* cited by examiner

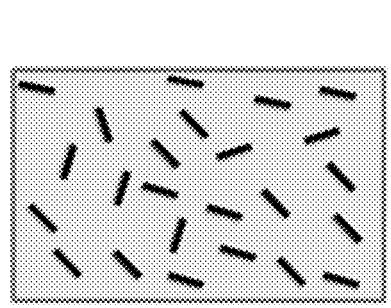
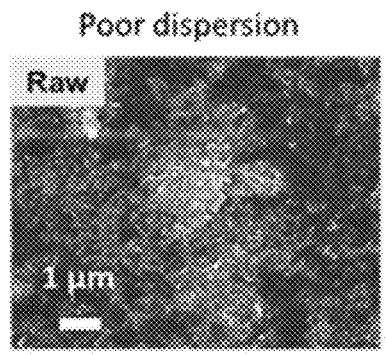
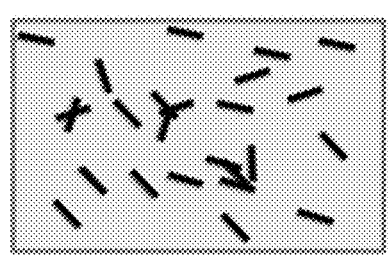
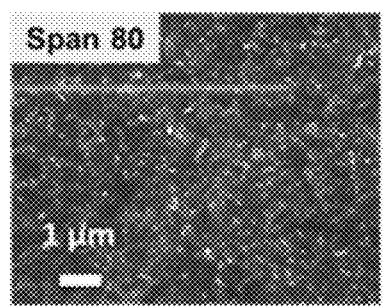
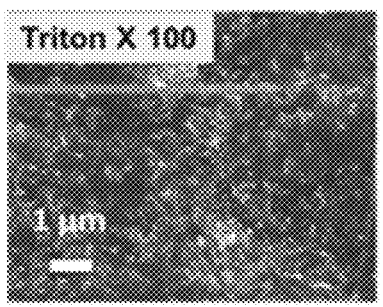
Figure 5a
Figure 5b
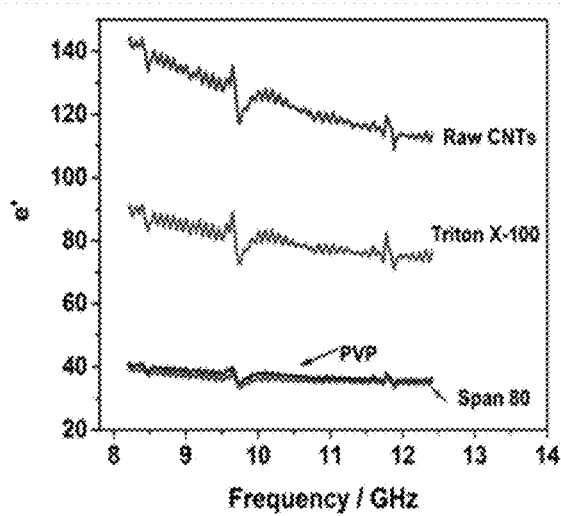
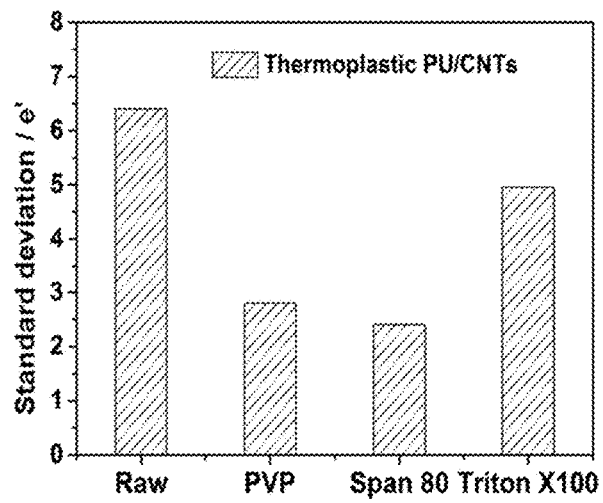
Figure 6a
Figure 6b

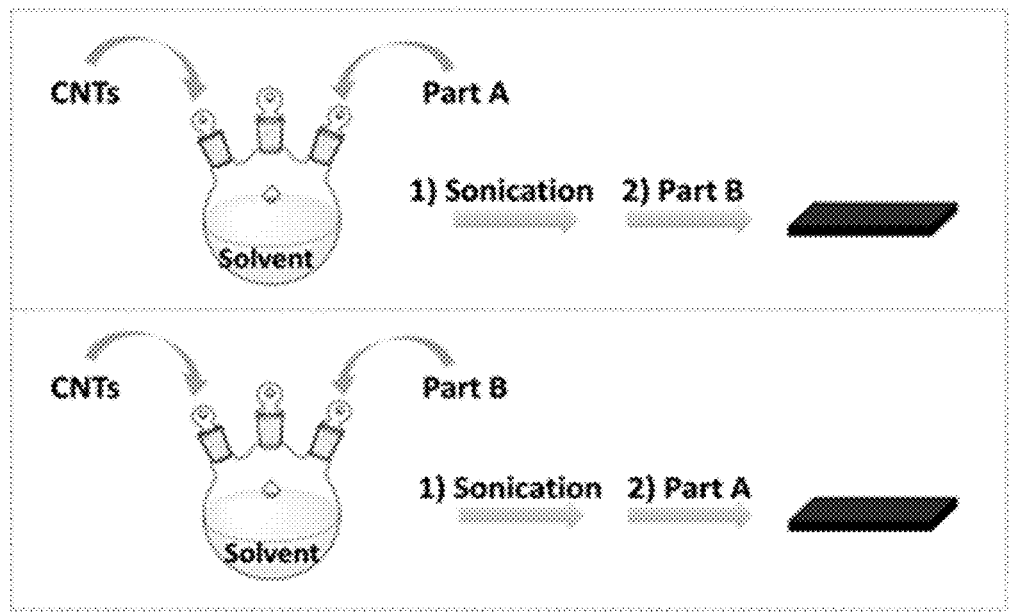
Figure 7a
Figure 7b
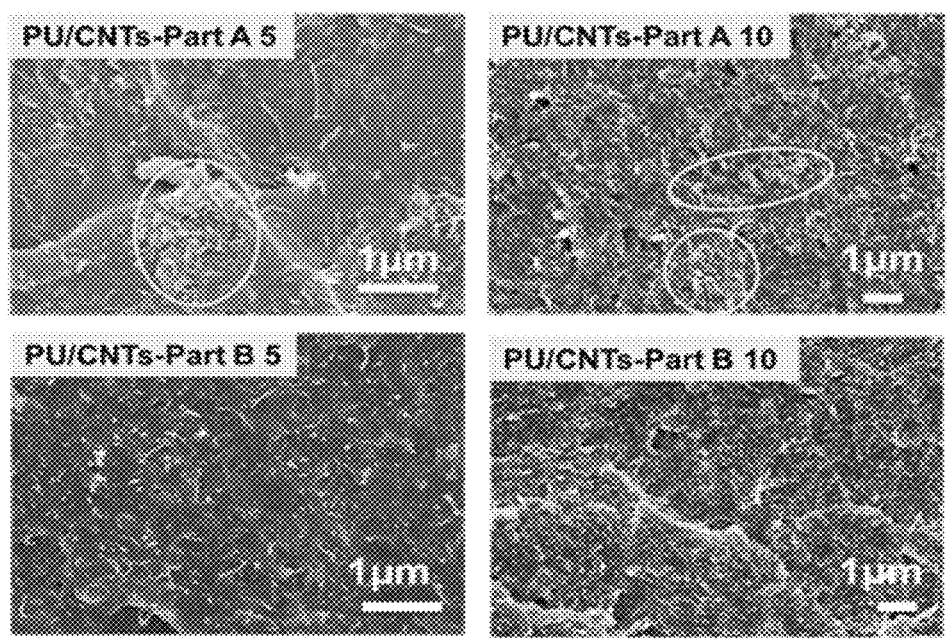
Figure 8

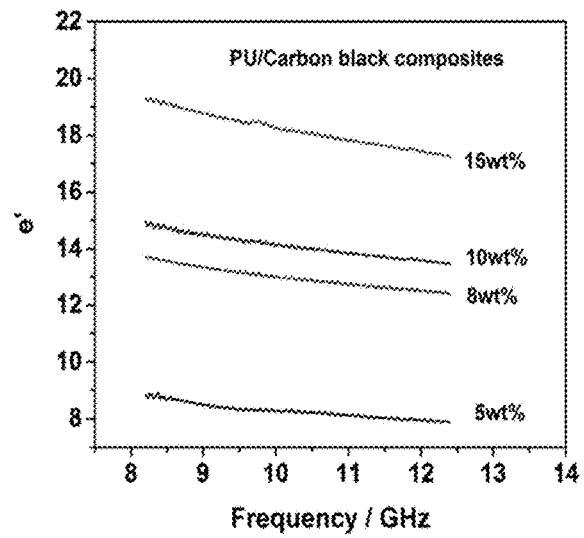
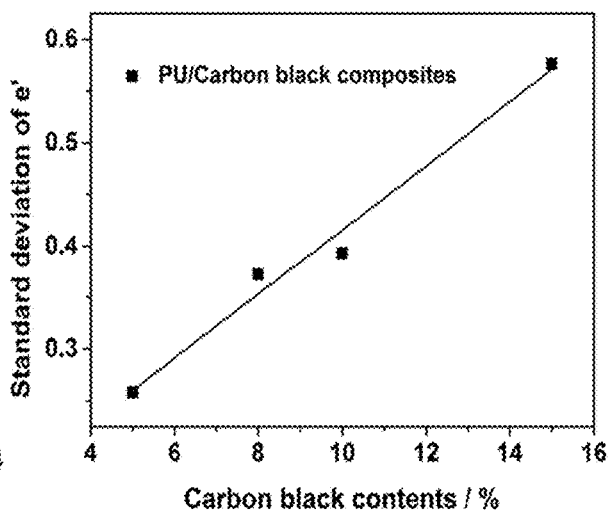
Figure 11a　　　　　　　　Figure 11b
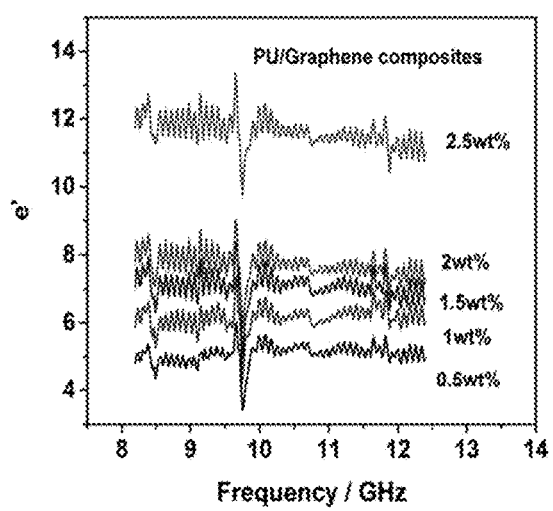
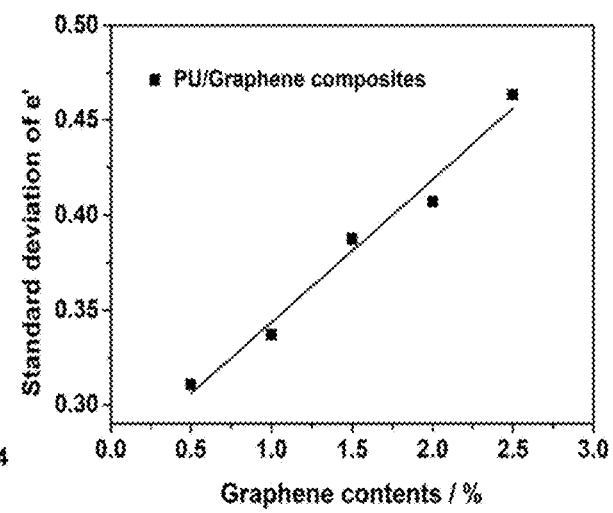
Figure 12a　　　　　　　　Figure 12b

NON-DESTRUCTIVE TESTING METHODS AND APPARATUS

CROSS-REFERENCE TO RELATED APPLICATIONS

The present application is a filing under 35 U.S.C. 371 as the National Stage of International Application No. PCT/SG2017/050610, filed Dec. 11, 2017, entitled "NON-DESTRUCTIVE TESTING METHODS AND APPARATUS," which claims priority to Singapore Application No. SG10201610348V filed with the Intellectual Property Office of Singapore on Dec. 9, 2016, both of which are incorporated herein by reference in their entirety for all purposes.

TECHNICAL FIELD

The present disclosure relates to non-destructive testing and in particular to the quantification of dispersion of fillers and/or the detection of defects in composites containing conductive fillers or reinforcements.

BACKGROUND

The market of products containing conductive fillers is extremely large. For example, the global market for lightweight materials used in transportation reached USD 115.4 billion in 2014. This market is expected to reach about USD 109 billion by 2015 and $188.7 billion by 2020, registering a compound annual growth rate (CAGR) of 11.6% from 2015 to 2020. The global carbon fiber reinforced composite (CFRP) market was valued at USD 20.29 Billion in 2014, and is projected to register a CAGR of 9.9% between 2015 and 2020. The market size of anti-corrosion coating was USD 22.45 Billion in 2015 and is projected to reach USD 30.04 Billion by 2021, registering a CAGR of 5.1% between 2016 and 2021. The conductive coating for electromagnetic interference (EMI) shielding applications is expected to reach USD 2.3 billion in 2019 and to register a rather modest CAGR of 3.6%.

All the above-mentioned industrial sectors require non-destructive testing (NDT) that is rapid, cost-effective, and reliable. NDT is considered a basic need in industries such as aerospace, oil & gas, petroleum, and construction, among others. The huge NDT market is estimated to be valued at USD 12.98 Billion in 2015 and is projected to reach USD 18.88 Billion by 2020, at a CAGR of 7.78% from 2015 to 2020.

Discontinuous conductive fillers can be of different materials including metal, carbon and inorganic based. Depending on the target applications of composites, the criterion of fillers selection is different. For example, in the field of electromagnetic interference shielding, the composites should have high electrical conductivity, in which metal fillers are popularly used. Currently, there is a trend that carbon-based fillers (e.g., carbon nanotube, graphene and carbon black) are used to replace metals to enhance comprehensive properties of composites, contributed by their low density, high conductivity, high modulus, and chemical stability. All these fillers possess excellent properties, but their dispersion, which is vital for the performance of composites can cause concern.

Continuous fillers correspond to another huge market. The representative one is carbon fiber, which is usually combined with other materials to form a composite, e.g., epoxy, nylon, polyurethane, ceramic, cement, and so on. Carbon fibers play an important role in different industries, such as aerospace, automobile, wind energy (wind turbine blade), and sport and furniture industry. Compared with discontinuous fillers, great concerns of carbon fiber reinforced composites are defects inside the composites, which are in the terms of de-bonding between fibers with matrix, fiber fracture, and matrix defects (voids, fracture, etc.). These defects could arise from fatigue, impact, and manufacturing.

To characterize the dispersion of discontinues fillers and defects in continuous filler reinforced composites, lots of technologies have been developed. Scanning electron microscope (SEM) and transmission electron microscopy (TEM) are commonly used techniques to observe the dispersion of discontinuous fillers and evaluation the defects of continuous fillers in composites. However, both of SEM and TEM are not practical for industrial applications, since their observations are limited to a small observation area. Additionally, the specimen preparation of SEM and TEM is destructive, complicated and non-representative. Another critical drawback of using SEM and TEM is the difficulty of evaluating dispersion at high filler loading, as the filler cannot be distinguished as whether individually dispersed or aggregated through visual observation.

To overcome the drawbacks of SEM and TEM, some non-destructive testing methods have been developed, e.g., X-ray computed tomography (CT). X-ray CT scan makes use of computer-processed combinations of many X-ray images taken from different angles to produce cross-sectional (tomographic) images of specific areas of a scanned object, allowing the user to see inside the object without cutting. X-ray CT has been successfully used for detection of defects in carbon fiber reinforced composite (CFRC) and dispersion of nano-fillers (e.g., graphene). However, X-ray machines are complicated and expensive. Moreover, the size of samples under test is limited by the chamber size. Although there are some other methods to detect defects in composites, like eddy current, ultrasonic testing and so on, there are no reports on their applications of fillers dispersion.

SUMMARY OF THE INVENTION

According to a first aspect of the present disclosure, a non-destructive testing method of analyzing a sample comprising a composite material is provided. The method comprises: emitting an electromagnetic signal onto the sample, the electromagnetic signal having a range of frequencies; detecting a response signal transmitted and/or reflected by the sample in response to the electromagnetic signal; processing the response signal to determine variation with frequency of a dielectric permittivity of the sample over the range of frequencies; and determining an indication of a structural characteristic of the sample from a measure of the variation with frequency of the dielectric permittivity of the sample.

In an embodiment, the structural characteristic of the sample comprises a defect level, a conductive filler concentration and/or a conductive filler dispersion level.

In an embodiment, the range of frequencies is within the range 0.1 KHz to 300 GHz and preferably in the range of 1 GHz to 300 GHz. In an embodiment, the range of frequencies is within the range 8 GHz to 13 GHz.

In an embodiment, the measure variation with frequency of the dielectric permittivity of the sample is a standard deviation.

In an embodiment, the method further comprises comparing the measure of the variation with frequency of the dielectric permittivity of the sample with a threshold criterion or a plurality of threshold criteria and evaluating the structural characteristic of the sample as a result of the comparison.

The sample may comprise a continuous conductive filler and/or a non-continuous conductive filler.

According to a second aspect of the present disclosure a non-destructive testing apparatus for analyzing a sample, a sample comprising a composite material is provided. The apparatus comprises: an emitter configured to emit an electromagnetic signal onto the sample, the electromagnetic signal having a range of frequencies; a detector configured to detect a response signal transmitted and or reflected by the sample in response to the electromagnetic signal; a network analyzer configured to process the response signal to determine variation with frequency of a dielectric permittivity of the sample over the range of frequencies; and a computing device configured to determine an indication of a structural characteristic of the sample from a measure of the variation with frequency of the dielectric permittivity of the sample.

In an embodiment, the emitter and the detector are integrated in a probe.

In an embodiment, the structural characteristic of the sample comprises a defect level, a conductive filler concentration and/or a conductive filler dispersion level.

In an embodiment, the range of frequencies is within the range 0.1 KHz to 300 GHz and preferably in the range of 1 GHz to 300 GHz. In an embodiment, the range of frequencies is within the range 8 GHz to 13 GHz.

In an embodiment, the computing device is configured to calculate the measure of variation with frequency of the dielectric permittivity of the sample as a standard deviation of the dielectric permittivity.

In an embodiment, the computing device is further configured to compare the measure of the variation with frequency of the dielectric permittivity of the sample with a threshold criterion or a plurality of threshold criteria and evaluating the structural characteristic of the sample as a result of the comparison.

The sample may comprise a continuous conductive filler and/or a non-continuous conductive filler.

BRIEF DESCRIPTION OF THE DRAWINGS

In the following, embodiments of the present invention will be described as non-limiting examples with reference to the accompanying drawings in which:

FIG. 5a illustrates a well-dispersed and arrogated arrangement of carbon nanotubes;

FIG. 5b shows scanning electron microscope images of the fracture surfaces of thermoplastic polyurethane/carbon nanotube composites with various surfactants;

FIG. 6a shows the variation of dielectric permittivity with frequency for each of the four samples shown in FIG. 5b;

FIG. 6b shows the standard deviation of the dielectric permittivity over the range of frequencies for each of the samples;

FIGS. 7a and 7b illustrate the preparation of polyurethane/carbon nanotube composites to demonstrate an example method of non-destructive testing;

FIG. 8 shows the fracture surfaces of polyurethane/carbon nanotube (CNT) composites with 5 wt % and 10 wt % of CNTs from different processing sequences;

FIG. 11a shows the variation of permittivity with frequency for PU/carbon black composites having different % wt of carbon black;

FIG. 11b shows the relationship between the standard deviation of the permittivity and the % wt of carbon black;

FIG. 12a shows the variation of permittivity with frequency for PU/graphene composites having different % wt of carbon black;

FIG. 12b shows the relationship between the standard deviation of the permittivity and the % wt of graphene;

DETAILED DESCRIPTION

Embodiments of the present disclosure relate to the dispersion evaluation and/or defects detection of composites containing conductive fillers or reinforcements. The present disclosure is based on a completely new mechanism and working principle in comparison to other existing or previously reported non-destructive measurement methods.

The working principle can be related to two generic theories proposed by John Pendry concerning the change of the number and effective mass of free electrons on individual conductive particles (wires) when they approach in close proximity. This change, which is also related to the plasmonic effect of electrons, becomes discontinuous when the inter-particle distance is below certain value. On the other hand, the number and effective mass of free electrons also affects the particles interaction with the electromagnetic wave, according to Lorentz-Drude theory. Therefore, the electromagnetic wave signal from a conducting particle dispersed material system, e.g., permittivity, carries information or signature of interaction or dispersion state of the particles. This is shown schematically in FIG. 1.

Figure 1:
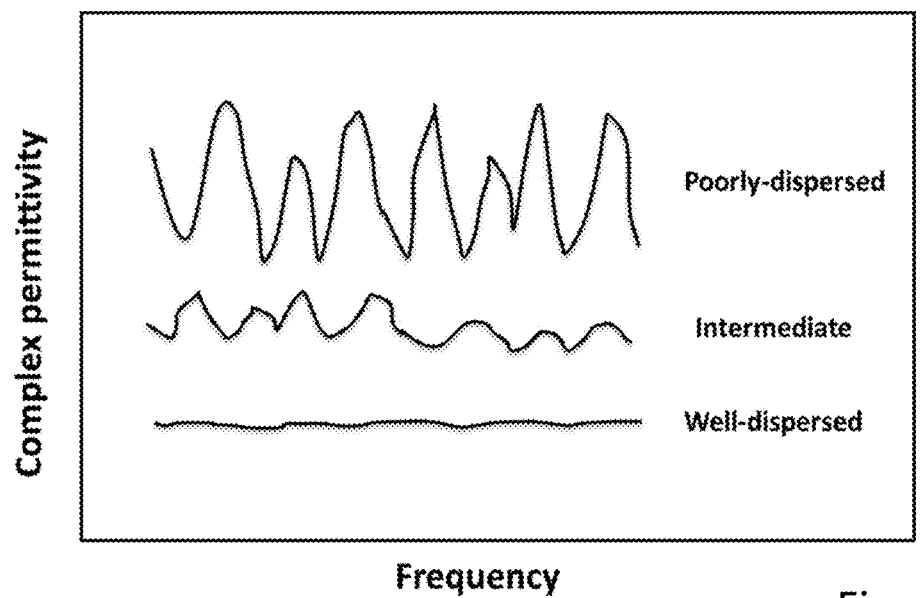
FIG. 1 is a graph schematically showing complex permittivity against frequency for poorly dispersed, intermediately dispersed and well dispersed composite structures.

FIG. 1 is a graph schematically showing permittivity against frequency for poorly dispersed, intermediately dispersed and well dispersed composite structures. As can be seen from FIG. 1, there is more 'noise' in the permittivity curve for the poorly dispersed system. The 'noise' here is in fact not random noise but some kind of harmonic oscillation whose strength is closely related to the dispersion state of the particles or defect level of in the composites. The new method of the present disclosure stems from quantifying the oscillation amplitude of permittivity versus frequency curves, which we term as a standard deviation (SD).

A close analogy of using information form 'noise' level was reported in a study on corrosion of a metallic material. In the study, noise analysis of electrochemical noise (ECN) was conducted. ECN is an electrochemical technique in which the potential and/or current signals that arise directly from the electrochemical reactions (corrosion) taking place on an electrode surface are measured and interpreted. In this work the equipment (an electrochemical workstation) tracks extremely small current and voltage fluctuations or noise among three electrodes made from the material of interest in a corrosion medium. Current is measured between two electrically coupled electrodes (a working electrode and a counter electrode), while the third electrode is connected between the working electrode and a pseudo reference electrode to measure the voltage. The measured stochastic pulses or oscillation of current/potential are related to different corrosion events such as rupture, cracking, discrete events involving metal dissolution (e.g., pitting) etc.

However, the stochastic ECN signal is used to detect corrosion, while in the methods described herein the oscillation of permittivity level is used to evaluate dispersion or distribution state of the discontinuous conductive fillers in the composites or defects in the continuous conductive fillers reinforced composites. In addition, the permittivity oscillation is not necessarily stochastic in the tests because most of the tests are done in static condition when the dispersion or defect states are fixed in a given composite or different regions of a composite material.

Figure 2:
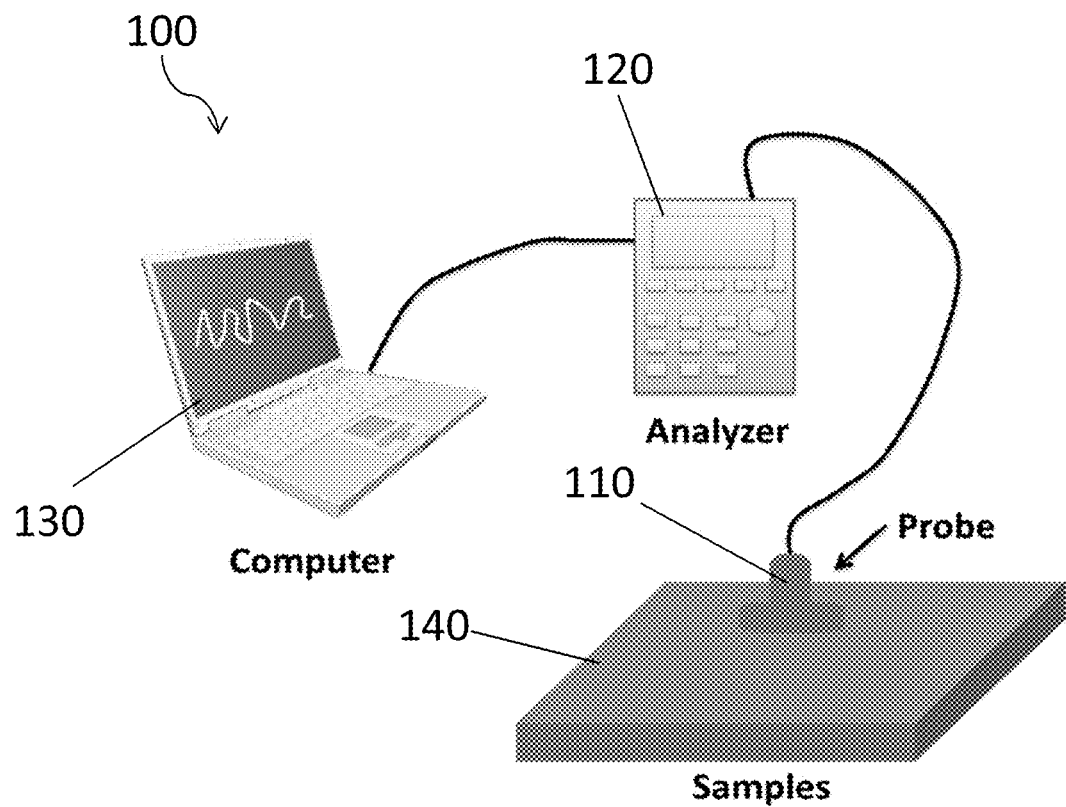
FIG. 2 shows an apparatus for performing non-destructive testing according to an embodiment of the present invention.

FIG. 2 shows an apparatus for performing non-destructive testing according to an embodiment of the present invention. The apparatus 100 comprises a probe 110 that is operable to emit and receive electromagnetic radiation. As shown in FIG. 2, the probe 110 emits signals to a sample and receives response signals reflected or transmitted by the sample 140. The probe 110 is coupled to a network analyzer 120 that comprises a signal generator and a signal detector. The network analyzer 120 is operable to generate different frequency signals and to analyze the response signal received from the probe 110 to determine the dielectric permittivity of the sample 140 and how the dielectric permittivity varies with the frequency of the electromagnetic radiation. The network analyzer is coupled to a computer 130 which receives data from the network analyzer representing the dielectric permittivity of the sample at different frequencies.

The probe is a structure that guides electromagnetic waves with minimal loss of energy by restricting expansion to one dimension or two. Without the physical constraint of a probe, electromagnetic wave amplitudes decrease as they expand into three dimensional space. In this method, a probe transfers electromagnetic wave energy to and from the network analyser. The probe can be changed based on the testing requirement/environment.

The sample 140 is a composite material comprising a conductive filler. The conductive filler may be based on carbon, metal and others, and distributed in a non-conducting matrix, e.g, polymer, hybrid, glass or ceramics. The composite material comprises a discontinuous or continuous filler. The dimensions of filler can be 0D, 1D and 2D, in which the size of filler can be nano-scale, micro-scale and millimeter-scale.

Figure 3:
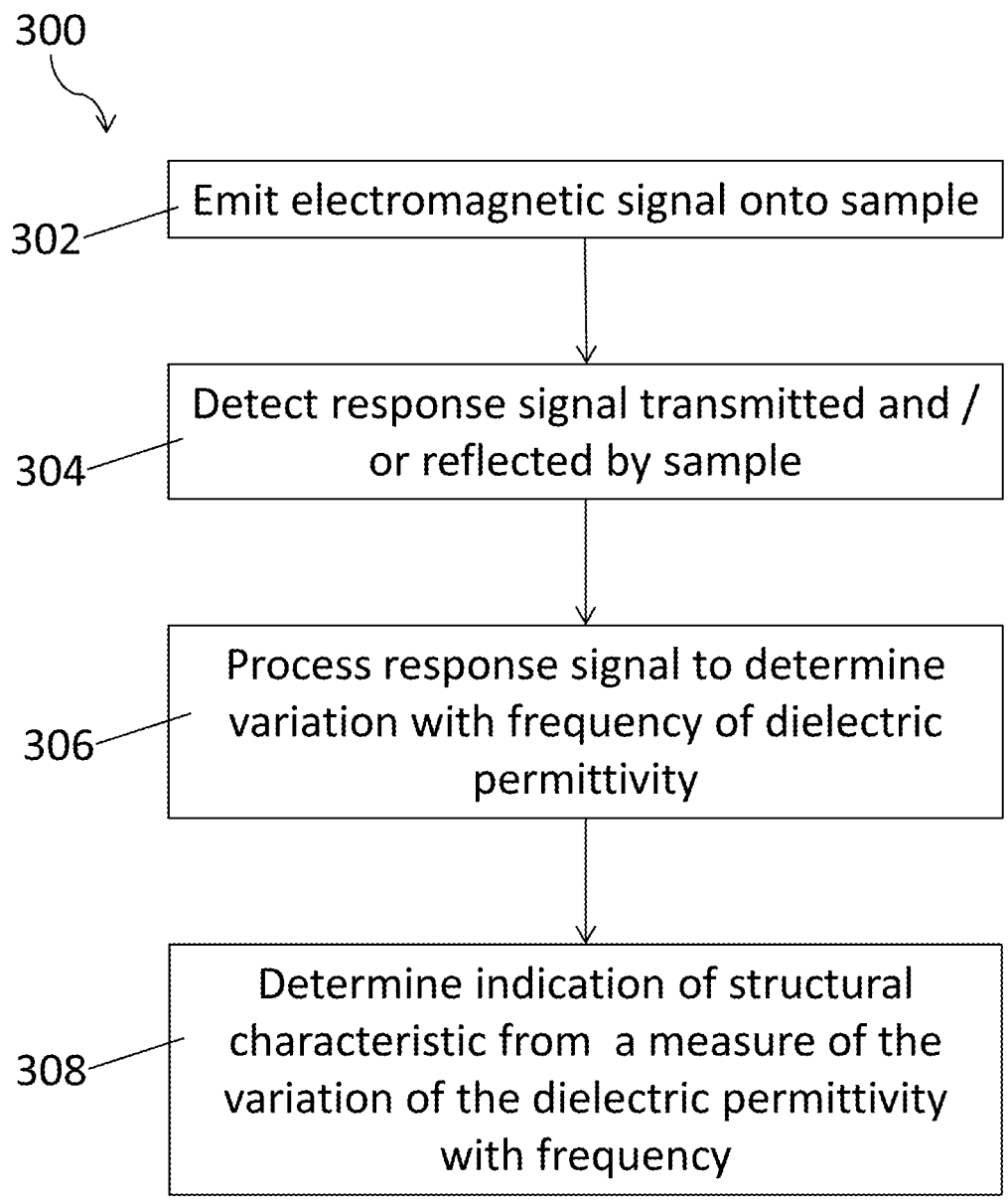
FIG. 3 shows a method of non-destructive testing according to an embodiment of the present invention.

FIG. 3 shows a method of non-destructive testing according to an embodiment of the present invention. The apparatus 100 shown in FIG. 2 may carry out the method 300 shown in FIG. 3.

In step 302, the probe 110 emits an electromagnetic signal onto the sample 140. The network analyzer 120 generates the electromagnetic signals which are varied in frequency. In some embodiments the frequency is varied in the x-band, that is between 8 GHz and 13 GHz. However, embodiments of the present invention are not limited to the x band. The present invention is also applicable for non-ionizing frequency range of 0.1 KHz to 300 GHz and preferably in the range of 1 GHz to 300 GHz for practical applications.

In step 304, the probe 110 receives and detects a response signal transmitted and/or reflected by the sample 140. In step 306, the network analyzer 120, processes the receive signal to determine the dielectric permittivity of the sample 140 for different frequencies. The network analyzer 120 generates data representing the variation of the dielectric permittivity of the sample with frequency. This data is received by the computer 130.

In step 308, the computer 130 determines an indication of a structural characteristic of the sample. The structural characteristic of the sample may be fiber woven/braiding structure, orientation, defects and impurities introduced during manufacturing, fiber breaking, delamination, debonding, matrix damages and other defects due to fatigue, aging, or other damage. The structural characteristic may be to detect stochastic defects, including dynamic defects and static defects formed during manufacturing, assembling or service. The structural characteristic may be a measure of the concentration of the filler.

In step 308, the computer determines a measure of the oscillation of the dielectric permittivity of the sample with frequency. This measure may be the standard deviation of the dielectric permittivity of the sample over the frequency range.

The standard deviation (SD) may be calculated using the following formula:

$$SD = \sqrt{\frac{\sum_{i=1}^{n}(x_i - \bar{x})^2}{n-1}} \quad SD = \sqrt{\frac{\sum_{i=1}^{n}(x_i - \bar{x})^2}{n-1}}$$

where $(x_1, x_2, \ldots, x_n)$ are the data point values of the sample, $\bar{x}$ is the mean value of these data points, and n is the number of the data points. The oscillation amplitude can be quantitatively measured by calculating SD.

In step 308, the computer may compare the calculated standard deviation with a calibration curve to determine the dispersion behavior of the conductive filler in the sample.

As described above, for discontinuous fillers, the SD could be used to determine the dispersion behaviour of the filler. For continuous filler, the SD could be used to determine the structural defects in the sample by comparing with the sample curve without structural defects.

FIGS. 4a to 4d show probes and emitter and detector systems used in embodiment of the present invention.

Figure 4A:
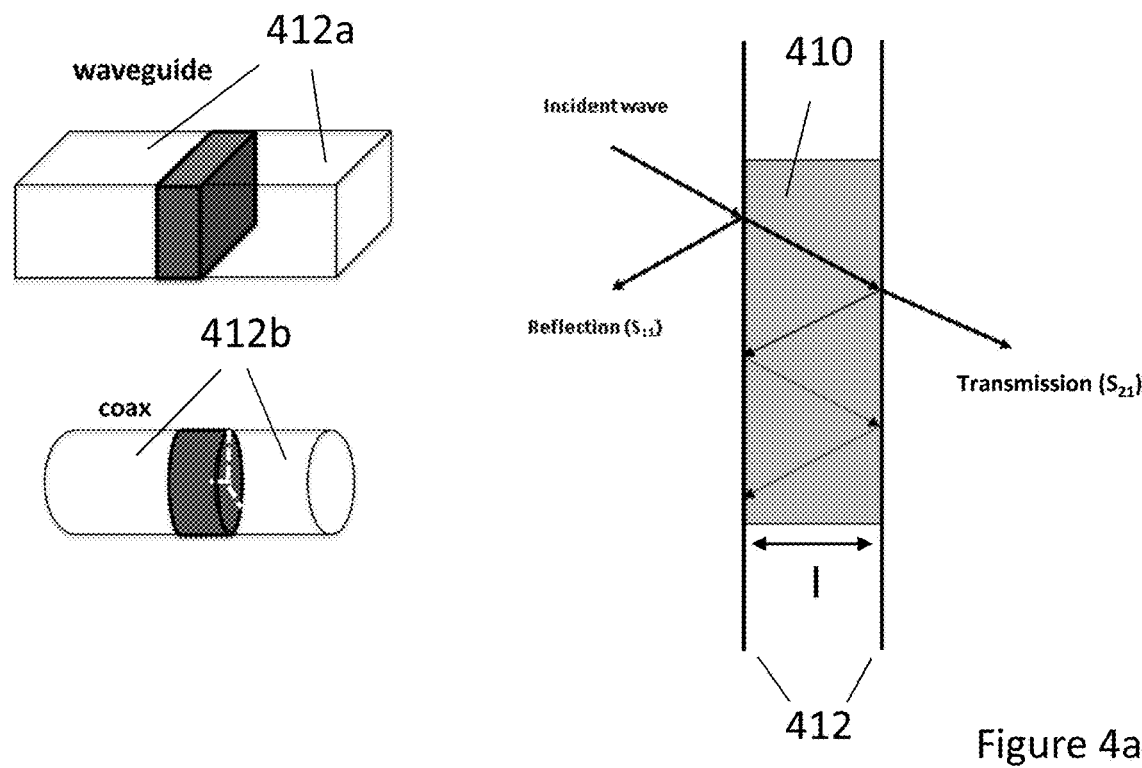
FIGS. 4a to 4d show probes and emitter and detector systems used in embodiment of the present invention.

FIG. 4a shows a transmission line method involves placing the material 410 inside a portion of an enclosed transmission line 412. The line is usually a section of rectangular waveguide 412a or coaxial airline 412b. Permittivity and permeability are computed from the measurement of the reflected signal (S11) and transmitted signal (S21). S11 is the reflected signal and S21 is transmitted signal. The complex permittivity can be obtained by using Nicholson-Ross-Weir (NRW) technique through S-parameters. The complex permittivity can also be retrieved using the network analyzer materials measurement software.

The probes may be connected to a section of rectangular waveguide 412a or coaxial airline 412b. One end of the probe is connected to the signal source (Port 1) of the network analyzer and the other end of the probe is terminated at the measurement port (Port 2) of the network analyzer. The signal source at Port 1 generates a uniform transverse electromagnetic (TEM) wave propagating along the transmission line test jig and the wave will be detected at Port 2 as a voltage signal.

Figure 4B:
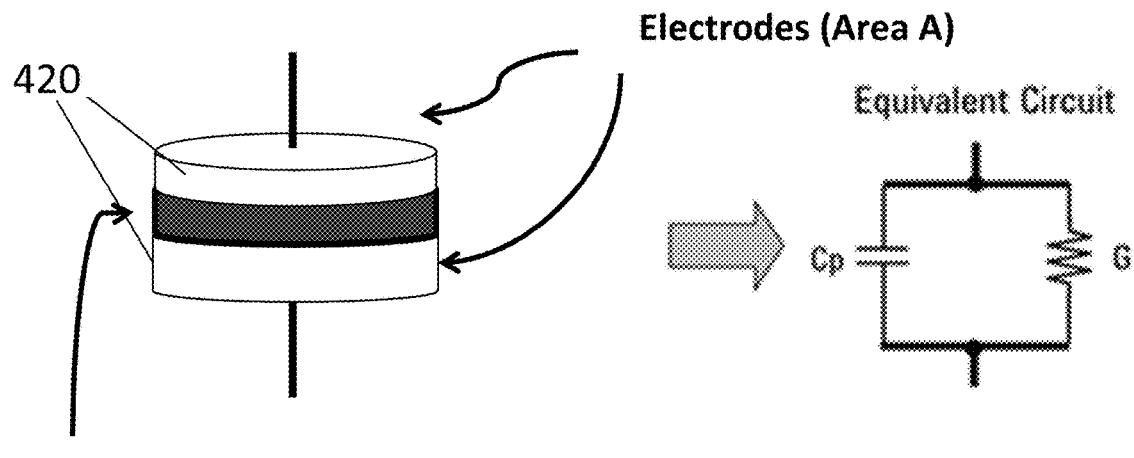

The sample thickness I has effects on the parameters like permittivity (E), permeability (μ), reflected signal (S11) and transmitted signal (S21). The theory is based on the equations below.

$$\varepsilon = n/z$$
$$\mu = nz$$
$$S_{11} = \frac{R_{01}(1 - e^{i2nk_0 l})}{1 - R_{01}^2 e^{i2nk_0 l}}$$
$$S_{21} = \frac{(1 - R_{01}^2)e^{ink_0 l}}{1 - R_{01}^2 e^{i2nk_0 l}}$$
$$R_{01} = \frac{z-1}{z+1}$$

z: impedance; n: refractive index; $K_0$: the wave number of the incident wave; I: sample thickness FIG. 4b shows a parallel plate method that involves sandwiching a thin sheet of material 422 or liquid 424 between two electrodes 420 to form a capacitor. The measured capacitance is then used to calculate permittivity. In an actual test setup, two electrodes are configured with a test fixture sandwiching dielectric material. The impedance-measuring instrument would measure vector components of capacitance (C) and dissipation (D) and a software program would calculate permittivity and loss tangent.

As shows in FIG. 4b, A is sample area; $C_p$ is capacitance; and G is resistance. These are related to the impedance by the following formula:

$$Z = G = j\omega C_p = j\omega C_0 \left(\frac{C_p}{C_0} - j\frac{G}{\omega C_0}\right)$$

$C_0$: air capacitance; ω: Angular frequency $$\text{Permittivity} = \frac{t \times C_p}{A \times \varepsilon_0}$$

t: sample thickness; $\varepsilon_0$: permittivity of free space, $$\varepsilon_0 = 8.854 \times 10^{-12} \text{ F·m}^{-1}$$

Figure 4C:
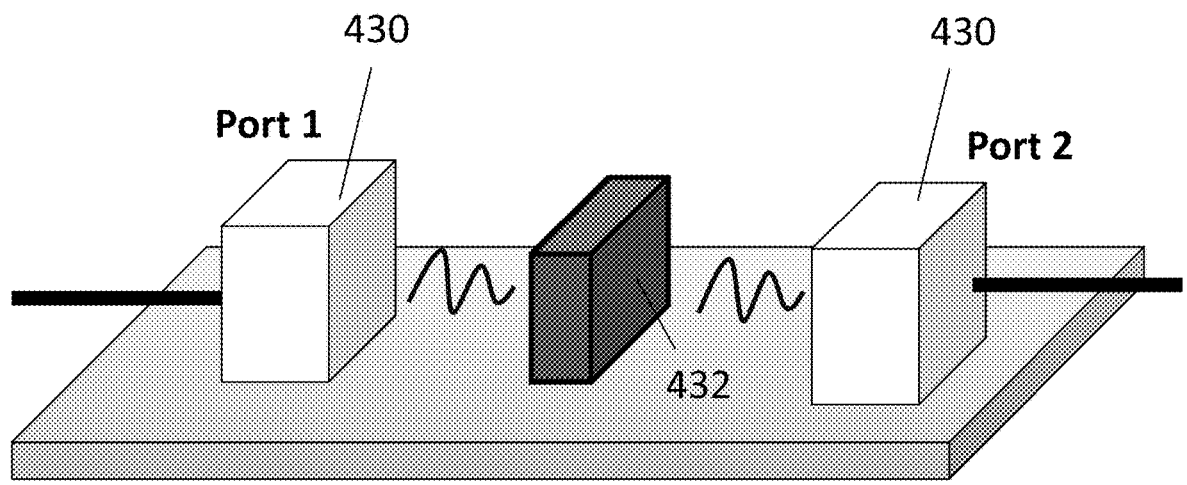

FIG. 4c shows free-space methods which use antennas 430 to focus microwave energy at or through a slab of material 432. This method is non-contacting since the antennas 430 are not required to contact the material 432 sample.

Figure 4D:
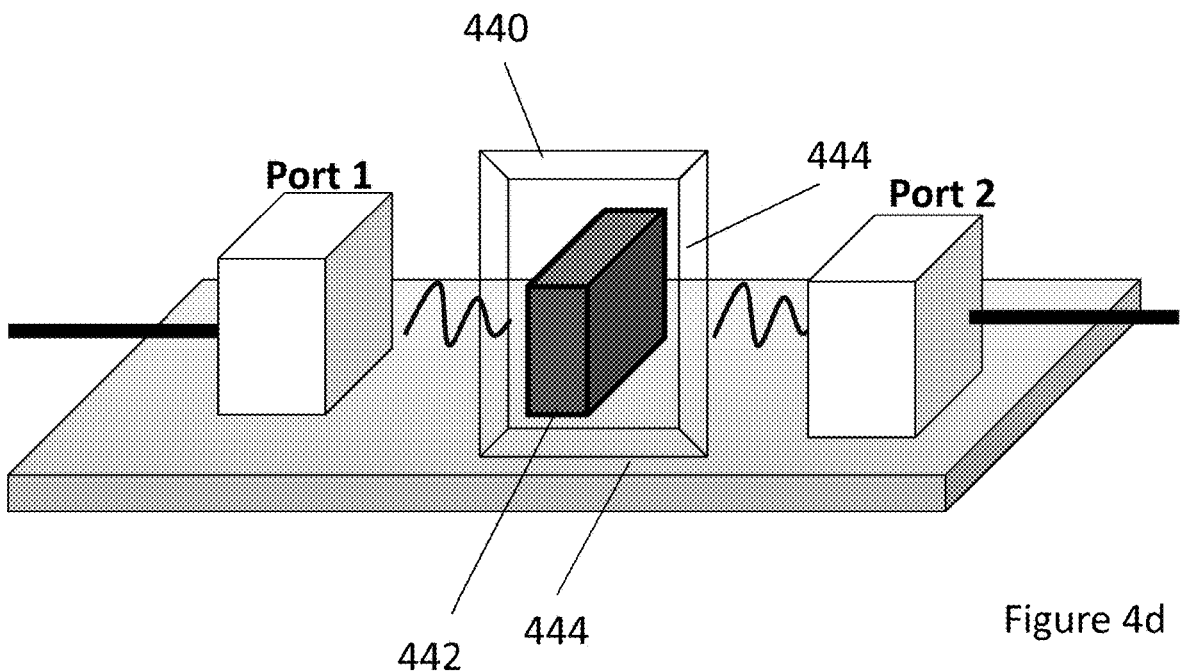

FIG. 4d shows high temperature measurements. These may be performed in free space since the sample is never touched or contacted as described above in relation to FIG. 4c. The sample 442 can be heated by placing it within a furnace 440 that has "windows" of insulation material 444 that are transparent to microwaves.

Example 1

Several surfactants (i.e., Span 80, Triton X-100 and polyvinyl pyrrolidone) were employed to facilitate dispersion of CNTs in a polymer matrix. The matrix was thermoplastic polyurethane (TPU), which was supplied in the form of pellets. 200 mg Raw-CNTs were added into 400 g acetone and ultrasonically dispersed for 1 h. Then, 200 mg surfactant was incorporated into CNTs suspension followed by the addition of 36 g 10% TPU in cyclohexanone solution. The TPU/surfactant-CNTs solution was further ultrasonically mixed in ultrasonic bath at room temperature. The solution was poured into a PTFE mold and dried in 80° C. oven to obtain a solid film.

FIG. 5a illustrates a well-dispersed arrangement and an arrogated arrangement of CNTs. FIG. 5b shows scanning electron microscope images of the fracture surfaces of thermoplastic polyurethane/carbon nanotube composites with various surfactants.

As can be seen from FIG. 5b, the CNT dispersions are improved with the use of surfactants.

The dielectric permittivity of the four samples shown in FIG. 5b was investigated over a range of frequencies of 8.2 GHz to 12.4 GHz.

FIG. 6a shows the variation of dielectric permittivity with frequency for each of the four samples shown in FIG. 5b. FIG. 6b shows the standard deviation of the dielectric permittivity over the range of frequencies for each of the samples.

The standard deviation was calculated using the formula given above for 201 values of the dielectric permittivity in the range 8.2-12.4 GHz.

As can be seen from FIG. 6b, the SDs of dielectric permittivity of composites with surfactant-assisted dispersed CNTs are clearly lower than the TPU with raw CNTs. Thus from the SDs it can be determined that the dispersion of the CNTs is greater in with the use of surfactants. This is consistent with the SEM images shown in FIG. 5b.

Example 2

In order to evaluate the sensitivity of this methodology, thermoset PU was employed. The thermoset PU was fabricated by mixing Part A (hardener) and Part B (polyol), which have different molecular structures. Raw CNTs were incorporated into PU at the concentration of 5 wt % and 10 wt %.

FIGS. 7a and 7b illustrate the preparation of polyurethane/carbon nanotube composites to demonstrate an example method of non-destructive testing.

As shown in FIG. 7a, CNTs and Part were added into a flask containing certain amount of solvent. Then the CNTs were dispersed for 3 h in an ultrasonic bath, following by the addition of stoichiometric amount of Part B. PU/CNTs-Part A was obtained after complete curing for 24 h at 60° C.

As shown in FIG. 7b, CNTs and Part B were added into a flask containing certain amount of solvent. Then the CNTs were dispersed for 3 h in an ultrasonic bath, following by the addition of stoichiometric amount of Part A. PU/CNTs-Part B was obtained after complete curing for 24 h at 60° C.

FIG. 8 shows the fracture surfaces of PU/CNTs composites with 5 wt % and 10 wt % of CNTs from different processing sequences. As shown in FIG. 8, the CNTs exhibited different dispersion states.

Figure 9A:
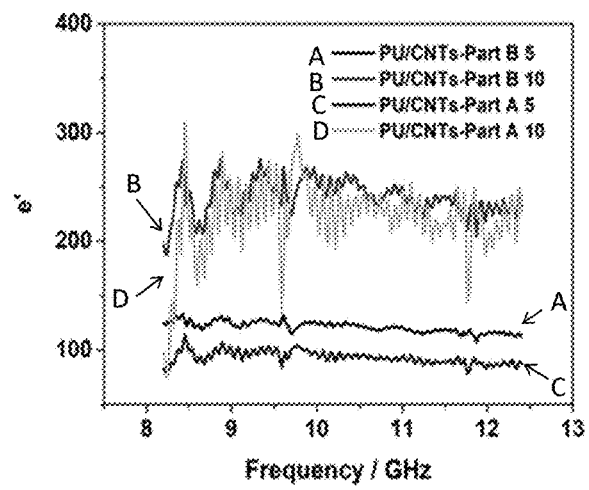
FIG. 9a shows the variation of dielectric permittivity with frequency for each of the four samples shown in FIG. 8.
Figure 9B:
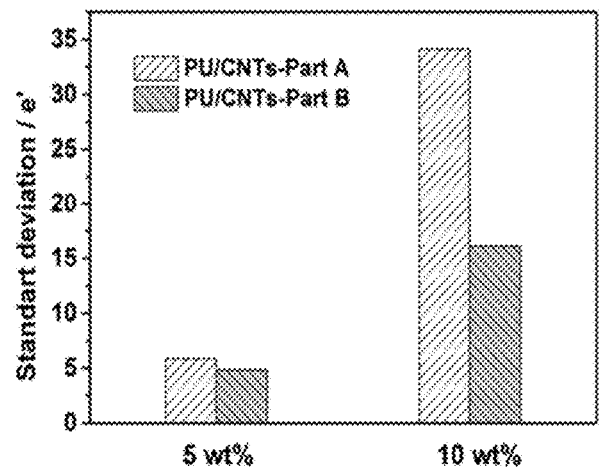
FIG. 9b shows the standard deviation of the dielectric permittivity calculated for each of the samples.

FIG. 9a shows the variation of dielectric permittivity with frequency for each of the four samples shown in FIG. 8. FIG. 9b shows the standard deviation of the dielectric permittivity over the range of frequencies for each of the samples. For both CNTs concentrations, poorly dispersion of CNTs in the PU matrix was observed for PU/CNTs-Part A composites. By employing the statistical analysis of dielectric permittivity, it was found that the standard deviations of dielectric permittivity in two-part PU/CNTs-Part A composites were higher than that in PU/CNTs-Part B, which is also consistent with the conclusion from SEM observation.

Example 3

It is inevitable that CNTs aggregate when CNTs loading increases. Thus, a series of PU/CNTs composites were prepared by varying the CNTs concentration from 1 wt % to 8 wt %. CNTs were dispersed in acetone for 1 h, followed by addition of Part A (hardener) and continuous 3 h ultrasonication. After a formation of homogeneous CNTs suspension, the mixture was concentrated by rotary evaporation, and further added into a three-neck flask containing stoichiometric Part B (polyols). The composites were obtained by casting the solution into a PTFE mould and subsequently removed the solvent at 60° C. for 24 h.

Figure 10A:
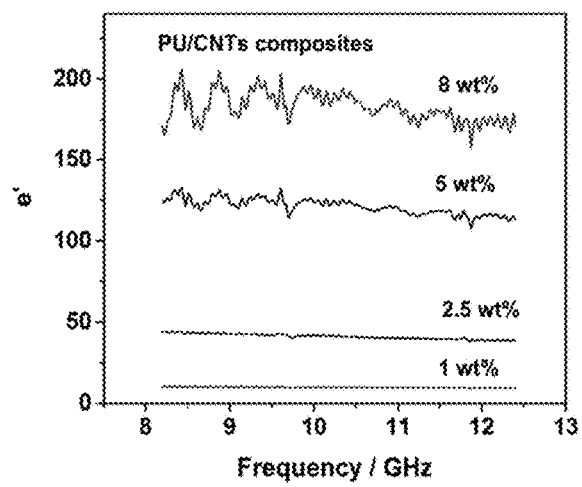
FIG. 10a shows the variation of dielectric permittivity with frequency for composites with varying carbon nanotube percentage content.
Figure 10B:
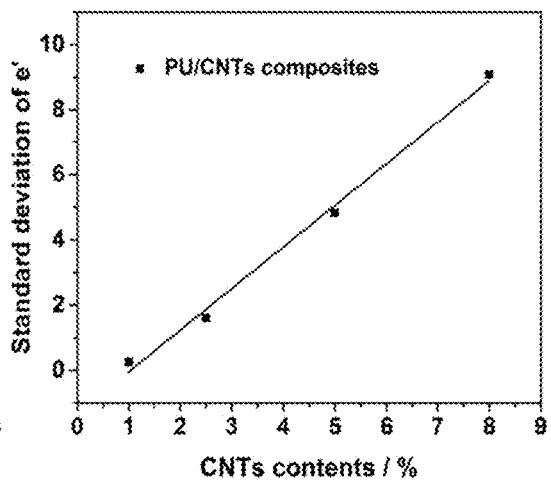
FIG. 10b shows the standard deviation of the dielectric permittivity as a function of carbon nanotube content.

FIG. 10a shows the variation of dielectric permittivity with frequency for composites with varying carbon nanotube percentage content. FIG. 10b shows the standard deviation of the dielectric permittivity as a function of carbon nanotube content.

As indicated in FIG. 10a, the oscillation in dielectric permittivity increases with increasing CNTs concentration. This oscillation may be quantified by the standard deviation as shown in FIG. 10b. Therefore, this method could provide the information that CNTs concentration differences. For example, the graph shown in FIG. 10b could be used as a calibration curve to determine the % wt of CNT of a sample.

Example 4

Examples 1-3 demonstrate that the new method is accurate, sensitive and reliable for 1D CNTs. 0D carbon black and 2D graphene were studied as well. Here, we investigated the relationship of oscillation of dielectric permittivity of 0D and 2D filler filled composites with the filler concentration. As mentioned above in Example 3, it is inevitable that fillers aggregate when increased filler loading.

Various amount of 0D carbon black (2D graphene) were dispersed in acetone for 1 h, followed by addition of Part A (hardener) and continuous 3 h ultrasonication. After a formation of homogeneous suspension, the mixture was concentrated by rotary evaporation, and further added into a three-neck flask containing stoichiometric Part B (polyols). The composites were obtained by casting the solution into a PTFE mold and subsequently removed the solvent at 60° C. for 24 h.

FIG. 11a shows the variation of permittivity with frequency for PU/carbon black composites having different % wt of carbon black.

FIG. 11b shows the relationship between the standard deviation of the permittivity and the % wt of carbon black.

FIG. 12a shows the variation of permittivity with frequency for PU/graphene composites having different % wt of carbon black.

FIG. 12b shows the relationship between the standard deviation of the permittivity and the % wt of graphene.

From FIGS. 11b and 12b, it can be seen that the relationship between the standard deviation and the % wt for both carbon black composites and graphene composites is linear. Thus, these results indicate that the methodology is suitable for both 0D and 2D conductive fillers.

Example 5

The present disclosure is based on the quantification of the oscillation of permittivity to evaluate the state of continuous conductive filler in composites. According to theories, the electrons in conductive fillers and interfacial polarization between fillers and matrix would be influenced by fillers' environment, resulting in the changed oscillation of complex permittivity.

Woven carbon fibre is a type of continuous conductive filler. In this example, commercial woven carbon fibre was employed to prepare carbon fibre reinforced polymer composite (CFRP) and verify the disclosed methodology. The detection on defects in CFRP by this method is not only focused on static detection, but applicable for stochastic damages occurred during the assembling of small pieces of CFRP. During the manufacturing of CFRP, three main factors determining the final properties of CFRP should be taken into account: 1) unwoven fibre randomly dispersed inside; 2) impurity; 3) orientation of carbon fibre mats.

Figures 13A, 13B:
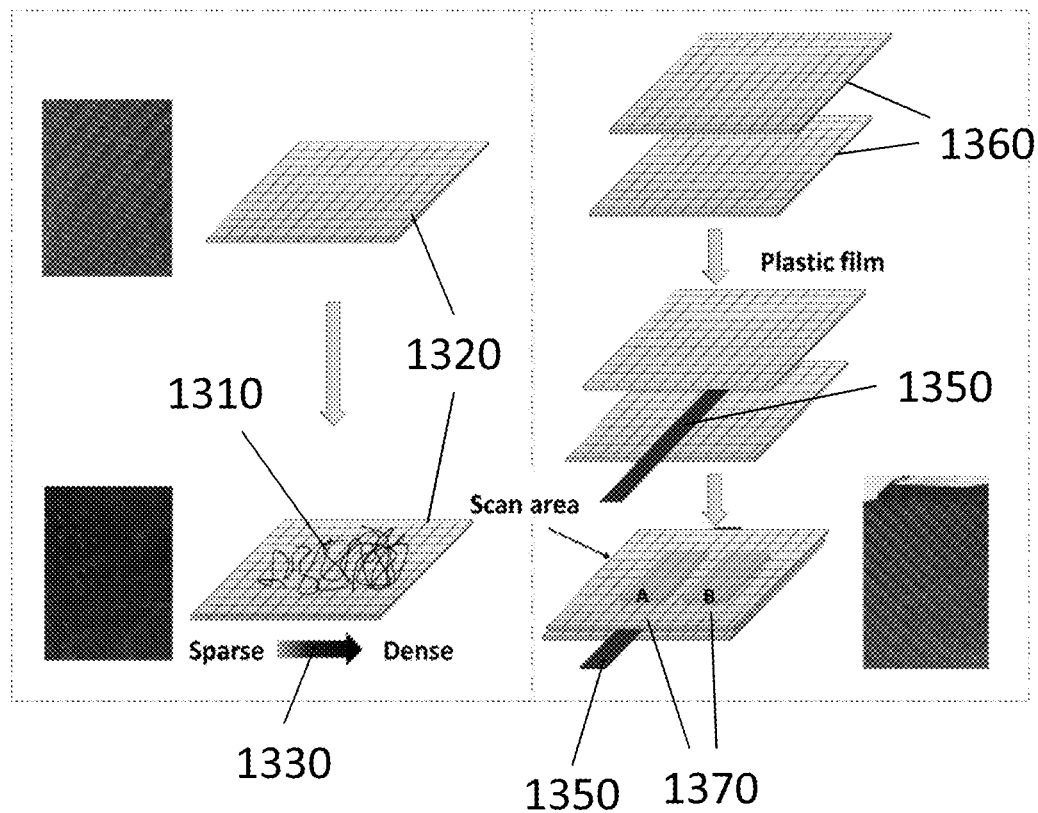
FIGS. 13a and 13b show the manufacture of CFRP with, respectively, unwoven fibres randomly dispersed and with an impurity.

FIGS. 13a and 13b show the manufacture of CFRP with, respectively, unwoven fibres randomly dispersed and with an impurity.

As shown in FIG. 13a, unwoven carbon fibres 1310 were randomly placed on the carbon fibre mats 1320 where the density of the distribution of carbon fibre was increased along one direction 1330.

As shown in FIG. 13b, to simulate an impurity, a plastic film 1350 was placed between two CFRP layers 1360. The plastic film was inserted between two CFRP before RTM manufacturing. The permittivity was investigated for two areas 1370 one (A) over the plastic film and the second (B) away from the plastic film.

Figure 14A:
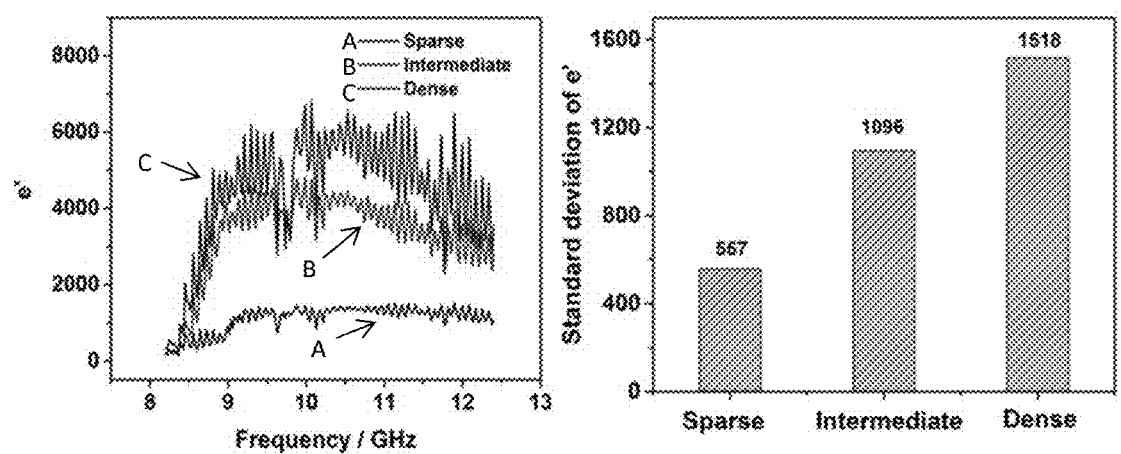
FIG. 14a shows the dielectric permittivity against frequency and the calculated standard deviation of the dielectric permittivity for the unwoven fibre sample.

FIG. 14a shows the dielectric permittivity against frequency and the calculated standard deviation of the dielectric permittivity for the unwoven fibre sample.

Figure 14B:
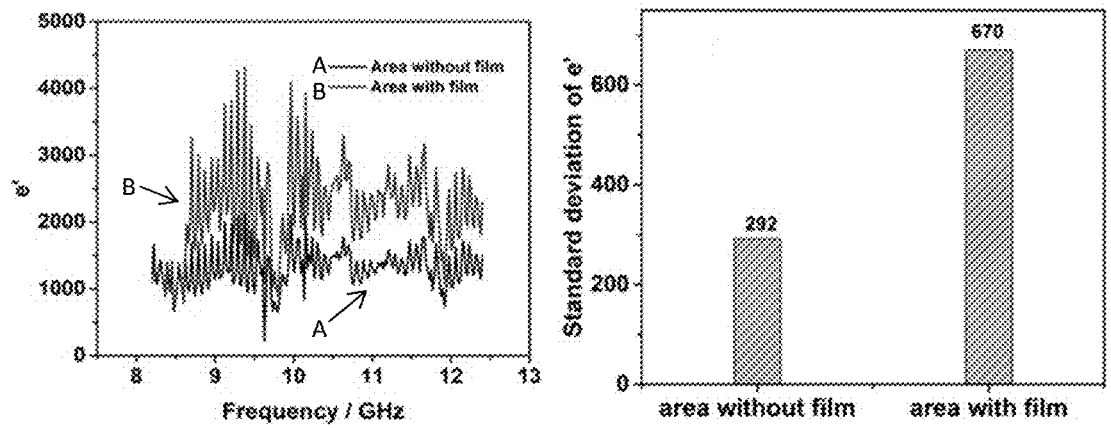
FIG. 14b shows the dielectric permittivity against frequency and the calculated standard deviation of the dielectric permittivity for the simulated impurity sample.

FIG. 14b shows the dielectric permittivity against frequency and the calculated standard deviation of the dielectric permittivity for the simulated impurity sample.

As is shown in FIGS. 14a and 14b, the different situations can be clearly distinguished from the standard deviation which quantifies the oscillation of the dielectric permittivity.

Another important parameter for CFRP fabrication is the orientation of carbon fibre mats, which is closely related to the mechanics of products. In order to demonstrate the relevance of the non-destructive testing methods to the determination of relative orientation of carbon fibre mats, orientations of 0 degree and 45 degree in CFRP were prepared.

Figure 15:
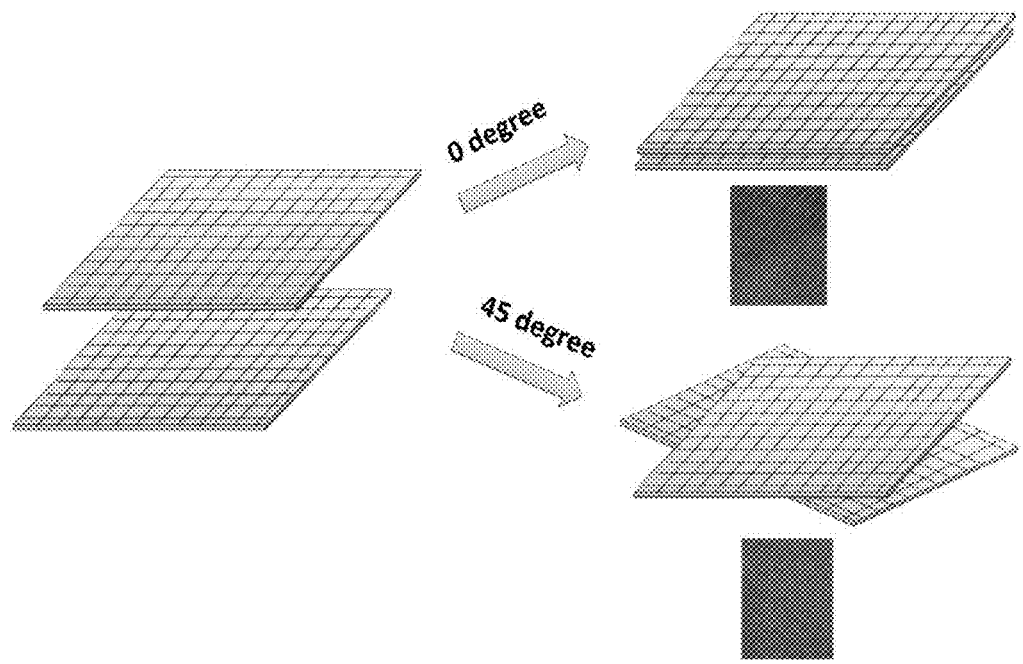
FIG. 15 shows the preparation of CFRP with different orientations.

FIG. 15 shows the preparation of CFRP with different orientations. As shown in FIG. 15, 0 degree and 45 degree orientations were prepared.

Figure 16:
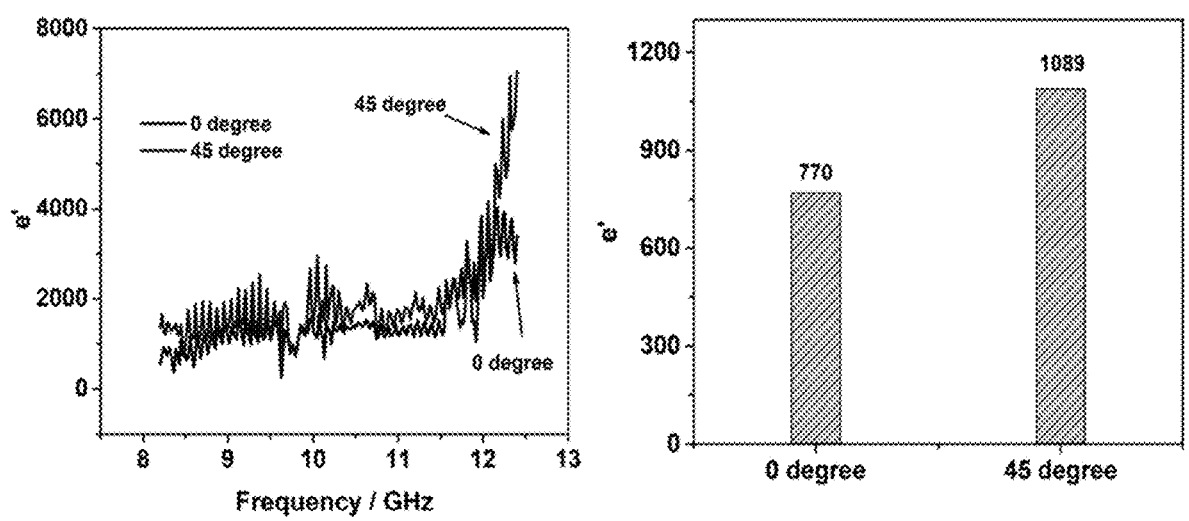
FIG. 16 shows the permittivity curves and calculated standard deviations for different orientations of CFRP.

FIG. 16 shows the permittivity curves and calculated standard deviations for different orientations of CFRP. As can be seen from FIG. 16, the non-destructive testing method can successfully detect the differences by quantifying the oscillation of dielectric permittivity.

Example 6

In addition to the defects during manufacturing, defects that form during the use of CFRP can also be detected by the non-destructive testing method. These defects include fibre breaking, de-bonding between fibre and matrix, delamination and so on. In order to demonstrate the detection of such defects by the non-destructive testing method, three types of defect were simulated as shown in FIGS. 17a to 17c.

Figure 17A:
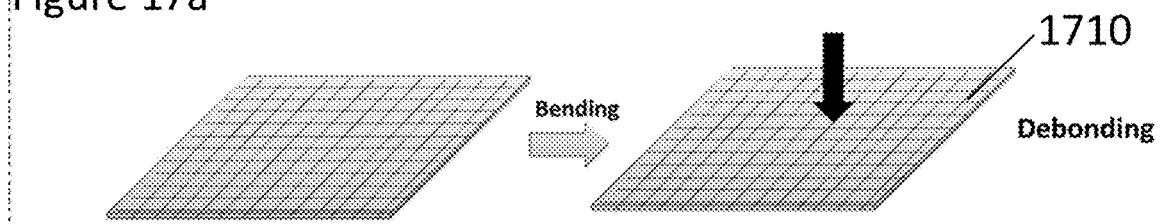
FIGS. 17a to 17c show the simulation of defects in CFRP.
Figure 17B:
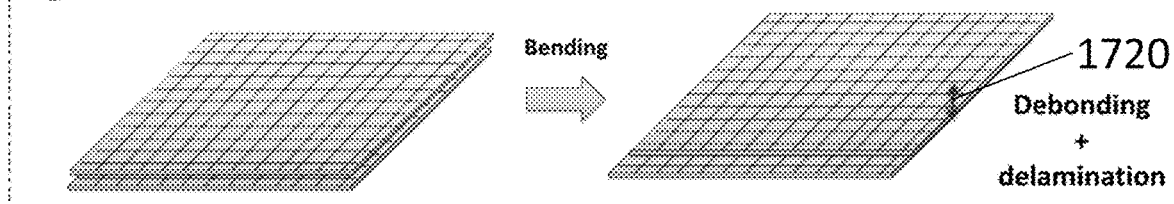
Figure 17C:
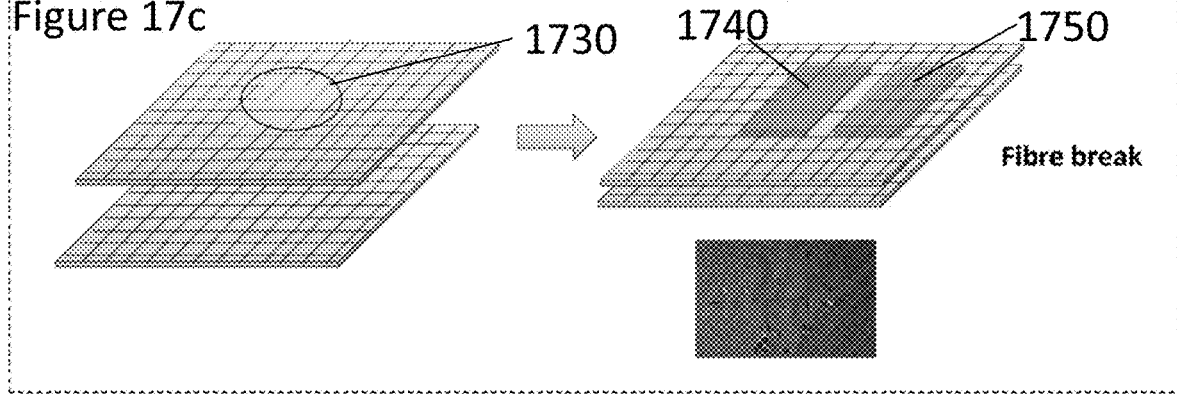

FIGS. 17a to 17c show the simulation of defects in CFRP. As shown in FIG. 17a, one single layer of CFRP 1710 was employed to create the defect of de-bonding. While the sample made from two layers of CFPR was used simulate the defects of delamination and de-bonding.

As shown in FIG. 17b, separation cracks 1720 were initially created between two layers of woven carbon fibre to simulate the defects of delamination.

As shown in FIG. 17c, small area of broken fibre 1730 was created on one layer of woven carbon fibre to simulate the defects of fibre break. An area with the crack 1740 and an area without the crack 1750 were analysed.

Figure 18A:
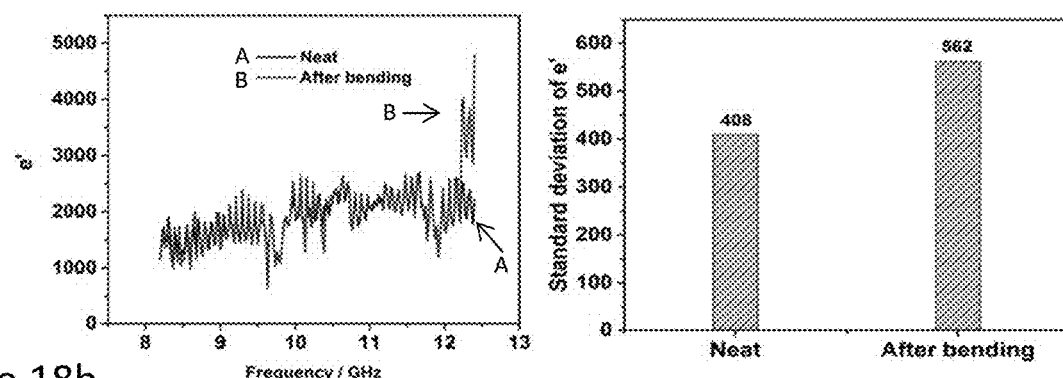
FIGS. 18a to 18c show the permittivity curves and calculated standard deviations for simulated defects.
Figure 18B:
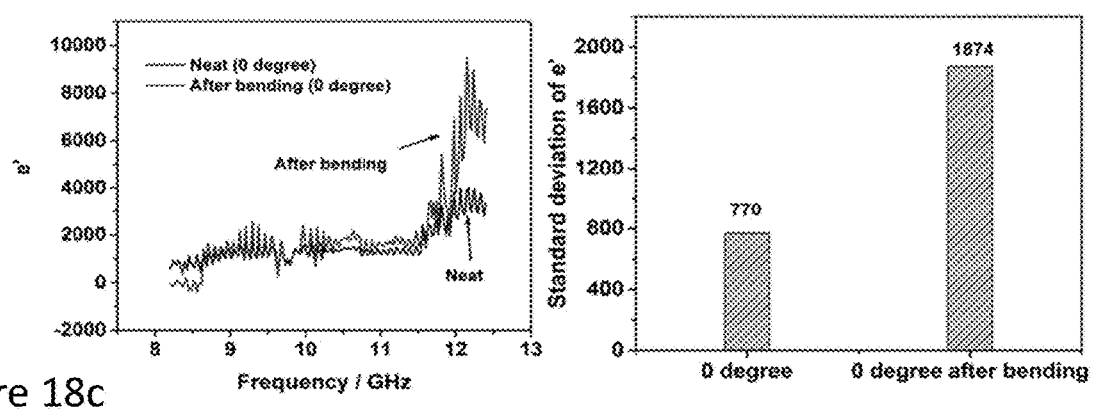
Figure 18C:
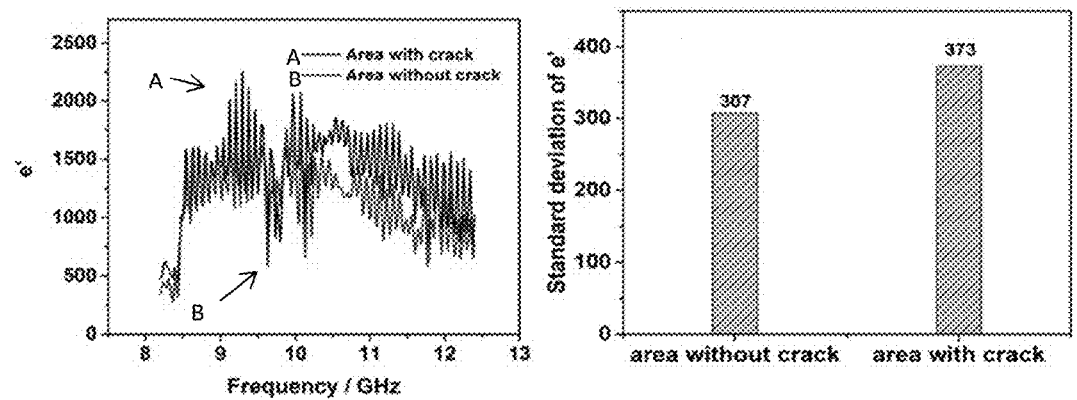

FIGS. 18a to 18c show the permittivity curves and calculated standard deviations for simulated defects. As shown in FIG. 18a, the bending of the single layer of CFRP causes an increase in the standard deviation. As shown in FIG. 18b, the increase is more pronounced for the delamination example. As shown in FIG. 18c, the presence of the crack causes an increase in the standard deviation.

The above examples demonstrate that the non-destructive testing methods may be used to identify characteristics of the internal structure of composite materials. The methods may also be used to detect different defects and the precise dispersion state detectable by proper calibration according customized requirements. For example, a criterion to evaluate filler dispersion (and distribution) and defect level (excellent, good, satisfactory and bad) may be established based on the calculated standard deviation.

This method described in this invention allowed the simple, direct and non-destructive evaluation of conductive filler dispersion (and distribution) or detection of the defects in CFRC composites. By monitoring and quantifying the oscillation of dielectric permittivity, the localized filler dispersion and defects can be evaluated.

The method mentioned in this disclosure have been verified by various conductive fillers and matrices. The composites containing conductive fillers are promising in many commercial and military applications, such as electromagnetic interference shielding, lightning-strike protection microwave absorption, anti-corrosion, thermal diffusion, electrically conductive composites and carbon fibre reinforced composites.

This method can be carried out with commercially available instruments (Vector Network Analyser) by connecting a computer, to directly quantify the oscillation of dielectric permittivity. The non-destructive testing method opens up a new dimension to determine the filler dispersion (and distribution) and defects detection. Attributed to the sensitive response of fillers to electromagnetic signal, this method could be one of the most sensitive methods in the field of non-destructive testing.

Whilst the foregoing description has described exemplary embodiments, it will be understood by those skilled in the art that many variations of the embodiments can be made within the scope and spirit of the present invention.

The invention claimed is:

1. A non-destructive testing method of analyzing a sample comprising a composite material, the method comprising:
    emitting an electromagnetic signal onto the sample, the electromagnetic signal having a range of frequencies;
    detecting a response signal transmitted and/or reflected by the sample in response to the electromagnetic signal;
    processing the response signal to determine variation with frequency of a dielectric permittivity of the sample over the range of frequencies; and
    determining an indication of a structural characteristic of the sample from a measure of the variation with frequency of the dielectric permittivity of the sample, wherein the sample comprises a continuous conductive filler and/or a non-continuous conductive filler.

2. A non-destructive testing method according to claim 1, wherein the structural characteristic of the sample comprises a defect level, a conductive filler concentration and/or a conductive filler dispersion level.

3. A non-destructive testing method according to claim 1, wherein the range of frequencies is within the range 0.1 KHz to 300 GHz.

4. A non-destructive testing method according to claim 3, wherein the range of frequencies is within the range 1 GHz to 300 GHz.

5. A non-destructive testing method according to claim 4, wherein the range of frequencies is within the range 8 GHz to 13 GHz.

6. A non-destructive testing method according to claim 1, wherein the measure variation with frequency of the dielectric permittivity of the sample is a standard deviation.

7. A non-destructive testing method according to claim 1, further comprising comparing the measure of the variation with frequency of the dielectric permittivity of the sample with a threshold criterion or a plurality of threshold criteria and evaluating the structural characteristic of the sample as a result of the comparison.

8. A non-destructive testing apparatus for analyzing a sample comprising a composite material, the apparatus comprising:
    an emitter configured to emit an electromagnetic signal onto the sample, the electromagnetic signal having a range of frequencies;
    a detector configured to detect a response signal transmitted and/or reflected by the sample in response to the electromagnetic signal;
    a network analyzer configured to process the response signal to determine variation with frequency of a dielectric permittivity of the sample over the range of frequencies; and
    a computing device configured to determine an indication of a structural characteristic of the sample from a measure of the variation with frequency of the dielectric permittivity of the sample, wherein the sample comprises a continuous conductive filler and/or a non-continuous conductive filler.

9. A non-destructive testing apparatus according to claim 8, wherein the emitter and the detector are integrated in a probe.

10. A non-destructive testing apparatus according to claim 8, wherein the structural characteristic of the sample comprises a defect level, a conductive filler concentration and/or a conductive filler dispersion level.

11. A non-destructive testing apparatus according to claim 8, wherein the range of frequencies is within the range 0.1 KHZ to 300 GHz.

12. A non-destructive testing apparatus according to claim 11, wherein the range of frequencies is within the range 1 GHz to 300 GHz.

13. A non-destructive testing apparatus according to claim 12, wherein the range of frequencies is within the range 8 GHz to 13 GHz.

14. A non-destructive testing apparatus according to claim 8, wherein the computing device is configured to calculate the measure of variation with frequency of the dielectric permittivity of the sample as a standard deviation of the dielectric permittivity.

15. A non-destructive testing apparatus according to claim 8, wherein the computing device is further configured to compare the measure of the variation with frequency of the dielectric permittivity of the sample with a threshold criterion or a plurality of threshold criteria and evaluating the structural characteristic of the sample as a result of the comparison.

16. A non-destructive testing method of analyzing a sample comprising a composite material, the method comprising:

emitting an electromagnetic signal onto the sample, the electromagnetic signal having a range of frequencies;

detecting a response signal transmitted and/or reflected by the sample in response to the electromagnetic signal;

processing the response signal to determine variation with frequency of a dielectric permittivity of the sample over the range of frequencies, wherein the measure variation with frequency of the dielectric permittivity of the sample is a standard deviation; and determining an indication of a structural characteristic of the sample from a measure of the variation with frequency of the dielectric permittivity of the sample.

* * * * *